United States Patent
Gonthier et al.

(10) Patent No.: US 9,674,294 B1
(45) Date of Patent: Jun. 6, 2017

(54) INTEGRATED COLLABORATION ENVIRONMENT

(75) Inventors: James N. Gonthier, Sutton, MA (US); John R. Langley, Hollis, NH (US); Joseph P. Conti, Newton, MA (US); Joel Robert Feenstra, Norwood, MA (US)

(73) Assignee: The MathWorks, Inc., Natick, MA (US)

( * ) Notice: Subject to any disclaimer, the term of this patent is extended or adjusted under 35 U.S.C. 154(b) by 543 days.

(21) Appl. No.: 13/222,797

(22) Filed: Aug. 31, 2011

Related U.S. Application Data

(60) Provisional application No. 61/492,623, filed on Jun. 2, 2011, provisional application No. 61/379,224, filed on Sep. 1, 2010.

(51) Int. Cl.
*H04L 29/06* (2006.01)
*H04L 29/08* (2006.01)

(52) U.S. Cl.
CPC .......... *H04L 67/2823* (2013.01); *H04L 67/08* (2013.01); *H04L 69/08* (2013.01)

(58) Field of Classification Search
CPC ..... G06F 15/16; H04L 67/08; H04L 67/2823; H04L 69/08
See application file for complete search history.

(56) References Cited

U.S. PATENT DOCUMENTS

| | | | |
|---|---|---|---|
| 6,615,253 B1* | 9/2003 | Bowman-Amuah | 709/219 |
| 6,738,815 B1* | 5/2004 | Willis et al. | 709/225 |
| 7,007,278 B2* | 2/2006 | Gungabeesoon | 719/311 |
| 7,404,177 B1* | 7/2008 | Greenfield et al. | 717/106 |
| 7,702,746 B2* | 4/2010 | Conner et al. | 709/217 |
| 7,945,949 B2* | 5/2011 | Johnson | 726/5 |
| 2005/0010893 A1* | 1/2005 | Schmidt et al. | 717/103 |
| 2005/0234864 A1* | 10/2005 | Shapiro | 707/1 |
| 2006/0136985 A1* | 6/2006 | Ashley et al. | 726/1 |
| 2009/0248475 A1* | 10/2009 | Choi et al. | 705/8 |
| 2011/0113377 A1* | 5/2011 | Lategan | 715/835 |

OTHER PUBLICATIONS

NPL1—(Title: Encapsulating Legacy Software for Use in Client/Server Systems; Ieee-1996; by Sneed).*
NPL1: (Title: Managing Unstructured Data With Structured Legacy Systems, nu Maluf et al, IEEE-2008).*

* cited by examiner

*Primary Examiner* — Aaron Strange
(74) *Attorney, Agent, or Firm* — Venable LLP; Michael A. Sartori; Ryan T. Ward

(57) ABSTRACT

A legacy command is received from a legacy application, where the command is for accessing data. The legacy command is processed using an interface, where processing includes converting the legacy command into a collaboration environment command compatible with a collaboration environment server. Data is requested using the collaboration environment command. A collaboration environment result is received based on the collaboration environment command, where the collaboration environment result includes the requested data. The collaboration environment result is converted into a legacy result using the interface, where the legacy result includes the requested data. The legacy result is provided to the legacy application.

17 Claims, 13 Drawing Sheets

INTEGRATED COLLABORATION ENVIRONMENT

CROSS-REFERENCE TO RELATED APPLICATION

This application claims benefit of Provisional Application No. 61/492,623 filed Jun. 2, 2011 and Provisional Application No. 61/379,224 filed Sep. 1, 2010, which are incorporated herein by reference.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION

Overview

Figure 1:
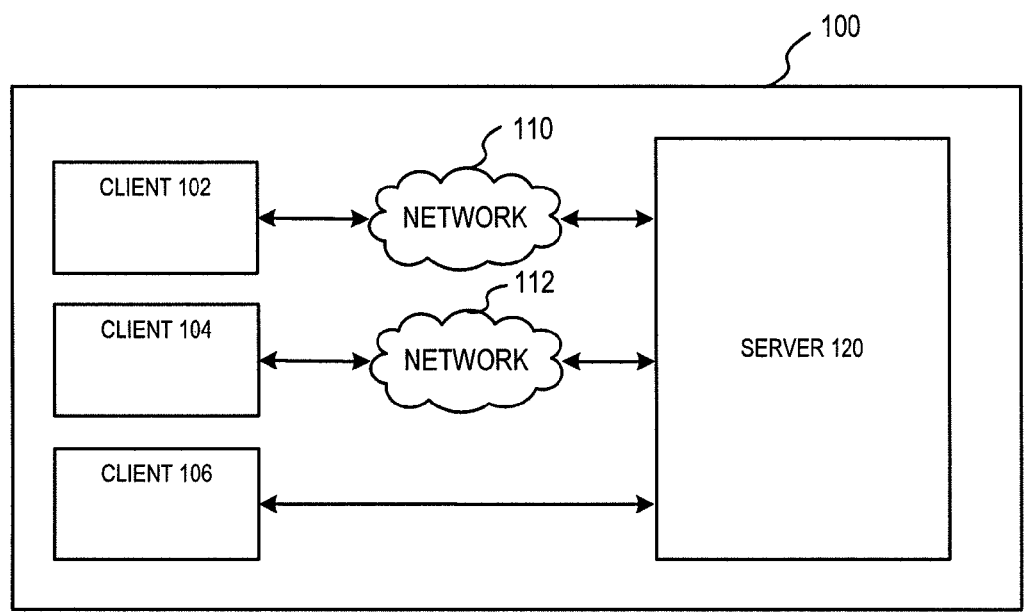
FIG. 1 illustrates an example schematic diagram of a system configured to practice an exemplary embodiment.

Computers make use of electronically stored information that can include instructions and/or data. Instructions may include computer-executable instructions, which may be stored on tangible non-transitory computer readable storage media. The computers may perform operations, such as sending or receiving a message, rendering a display, etc., when the instructions are executed. Data may include numerical values, characters, images, etc. Data may further include outputs from devices, such as sensors, other computers, embedded devices, etc. Data can include metadata, which is used to describe or refer to data or the structure of data. Contemporary computing environments can benefit when electronically stored information is shared.

Electronically stored information may be collaboratively shared between two or more devices. For example, data may be shared to allow two users, each working on a separate device, to simultaneously work on the same data. Updates provided by the respective user devices may be incorporated into the data. In addition, one user device may be able to interact with data updates provided by the other user device. Accordingly, collaborative sharing may enable groups of users to work together in ways that are more efficient, productive, etc., than if the users were working individually (e.g., in a standalone environment).

One way to provide collaborative sharing is through a collaboration, or collaborative, environment. For example, a collaboration environment may enable files to be simultaneously accessed by multiple applications running on multiple computers (e.g., computers that are remote with respect to each other). A collaboration environment may provide further advantages, for example, version control and/or update notifications.

Conventional collaboration environments may rely on applications specially designed and configured to interact in a collaborative arrangement. These applications may require that instructions/data may be specially formatted for use in the collaborative arrangement. These specially designed applications may prevent users of certain devices and/or applications from having access to collaboration environments. For example, a user of a standalone application may be unable to participate in collaborative computing because the legacy application cannot communicate using collaborative protocols or message types.

Conventional standalone applications may be referred to as legacy applications and can represent significant investments in terms of cost and infrastructure (e.g., information technology (IT) support, data archiving systems, operating systems, file systems, etc.). Users of standalone applications may wish to work in collaboration environments to take advantage of remote resources, simultaneously interacting with data in conjunction with a collaborative application running on a remote computer, etc. However, these users may be unable to interact with collaboration environments because existing applications may be incapable of operating in a collaboration environment. Moreover, users may not have the resources to acquire, install, and maintain new collaborative applications and necessary supporting infrastructures. As a result, users of legacy applications may be excluded from making use of collaboration environments.

By way of example, a user may have a legacy application that includes a technical computing environment (TCE), graphical modeling software, analysis software, etc., configured to operate in a standalone implementation (e.g., on a user's desktop computer). These legacy applications may be unable to interact with a collaboration environment because the legacy applications may not generate or interpret instructions/data formatted for the collaboration environment. In addition, the legacy applications may be configured to interact with a local file system and may not include inherent capabilities that allow the local file systems to be shared via a collaboration environment.

Exemplary embodiments can allow legacy applications to be integrated with a collaboration environment using an interface. The interface may serve as an adapter between the legacy application and the collaboration environment. For example, the interface may convert instructions/data from a format compatible with the legacy application to a format compatible with the collaboration environment, and vice versa. In addition, the interface may allow local file systems on a client device to interact with the collaboration environment. Embodiments of the interface may allow for bidirectional communication and/or data exchange between the legacy application and the collaboration environment without requiring modifications to the legacy application or to the collaboration environment. The interface may also be platform independent. Additionally, the interface can also allow two legacy applications to interact as peers in a collaboration environment without requiring modifications to either legacy application.

Exemplary System

FIG. 1 illustrates a schematic diagram of a system configured to practice an exemplary embodiment. The system may include integrated collaboration environment (ICE) 100. ICE 100 may include one or more clients 102, 104, and/or 106 (collectively clients 102) one or more networks 110 and/or 112, and server 120. In an embodiment of ICE 100, clients 102 may run legacy applications and ICE 100 may allow clients 102 to use the legacy applications collaboratively. For example, an embodiment ICE 100 may include interfaces that can be configured to allow legacy applications to collaborate over networks 110, 112.

Clients 102 may provide users with access to legacy applications that can be run in standalone modes or that can be used in collaborative computing arrangements via ICE 100. Clients 102 can include a device capable of sending and/or receiving information (e.g., data, instructions, etc.) to and/or from another device, such as server 120. Information may include any type of machine-readable information having substantially any format that may be adapted for use, e.g., in one or more networks and/or with one or more devices. The information may include digital information and/or analog information. The information may further be packetized and/or non-packetized.

Clients 102 may be, for example, a desktop computer, a laptop computer, a client computer, a mainframe computer, a personal digital assistant (PDA), a web-enabled cellular telephone, a smart phone, smart sensor/actuator, or another computation or communication device executing instructions that enable the device to perform one or more activities and/or generate one or more results.

Networks 110 and 112 may, respectively, include a network capable of exchanging information between entities associated with the network, including, for example, clients 102, 104, and/or 106 and server 102. Exchanged information may include, for example, packet data and/or non-packet data. Implementations of network 110 and 112 may include local area networks (LANs), metropolitan area networks (MANs), wide-area networks (WANs), etc. Information may be exchanged between entities using any network protocol, such as, but not limited to, the Internet Protocol (IP), Transmission Control Protocol/Internet Protocol (TCP/IP), Asynchronous Transfer Mode (ATM), Synchronous Optical Network (SONET), the User Datagram Protocol (UDP), Institute of Electrical and Electronics Engineers (IEEE) 802.11, etc. Network 110 and 112 can further include devices, such as routers, switches, gateways, etc.

Server 120 may provide services to clients 102, such as services for allowing legacy applications of clients 102 to be used collaboratively. For example, server 120 may receive data from client 102 and transmit the data to client 104. Server 120 may be in communication with clients indirectly through network 110 and/or 112 (e.g., as shown with client 102 and 104), or through a direct connection (e.g., as shown with client 106).

The embodiment of ICE 100 depicted in FIG. 1 is illustrative and other embodiments of ICE 100 can take other forms. For example, alternative embodiments may have fewer components or more components than the embodiment of FIG. 1. Moreover, components of ICE 100 may be configured in ways that differ from the configuration of FIG. 1 without departing from the spirit of the invention.

Additionally, components of ICE 100 may be implemented in hardware-based logic, software and/or logic that is a combination of hardware-based logic and software (e.g., hybrid logic); therefore, the components in the examples herein are not limited to a specific type or implementation of logic.

Exemplary Client

Figure 2:
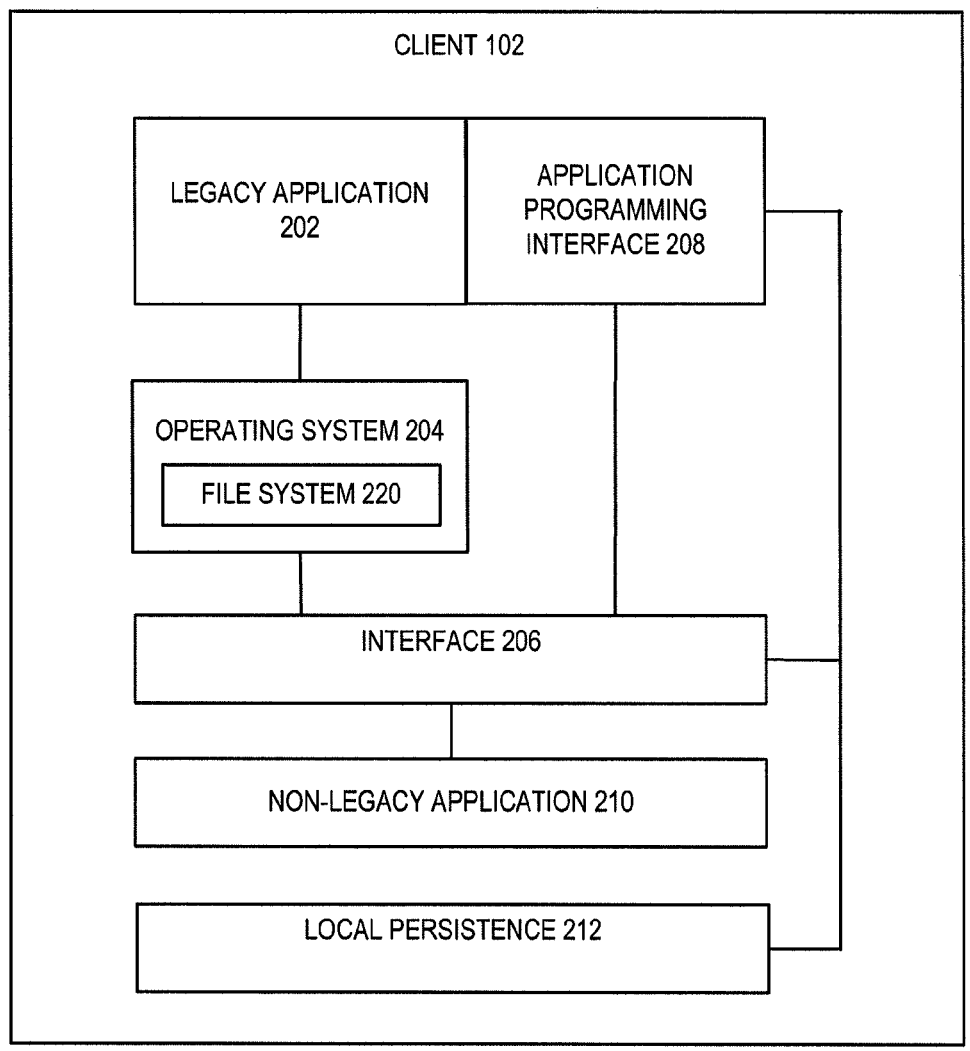
FIG. 2 illustrates an example schematic diagram of a client configured to practice an exemplary embodiment.

FIG. 2 illustrates an example schematic diagram of a client 102 configured to practice an exemplary embodiment. Client 102 may include legacy application 202, operating system 204, interface 206, application programming interface (API) 208, non-legacy application 210, and local persistence 212.

Legacy application 202 may be an application configured primarily for standalone use on clients 102. Examples of legacy application 202 may include, but are not limited to, a word processing application, a spreadsheet application, a graphics application, a database application, a TCE, etc. For example, in an embodiment, a TCE may include a textual environment that may be used for constructing and executing textual models on a client. In another embodiment, a TCE may include a graphical block diagram environment that may be used to manipulate and/or execute graphical models on a client. Still further, a TCE can be a hybrid environment that includes both textual and graphical model building and executing functionalities. Embodiments of legacy application 202 may contain computer-executable instructions and/or data configured to perform operations on a client. In an embodiment, the executable instructions may be stored in local persistence 212 in an exemplary client 102.

Operating system 204 may manage hardware and/or software resources associated with client 102. For example, operating system 204 may manage tasks associated with receiving user inputs, operating a computing environment, allocating memory, prioritizing system requests, etc. In an embodiment, operating system 204 may be a virtual operating system. Embodiments of operating system 204 may include Linux™, Mac OS™, Microsoft Windows™, Solaris™, UNIX™, etc, operating systems. Operating system 204 may further run on a virtual machine, which can be provided by client 102. Operating system 204 may also include local file system 220. Embodiments of local file system 220 may be compatible with legacy application 202. Operating system 204 may be in communication with legacy application 202, and may use local file system 220 to receive and transmit instructions and/or data to and from legacy application 202. Instructions and/or data of local file system 220 may be stored in local persistence 212.

Interface 206 may include code for integrating legacy application 202 with server 120. In an embodiment, interface 206 may be an adapter that integrates legacy application 202 with server 120 by converting instructions and/or data from a format compatible with legacy application 202 to a format compatible with server 120, and vice versa. For example, interface 206 may receive data from server 120 that is incompatible with legacy application 202. Interface 206 may convert the incompatible data into a format that is compatible with legacy application 202. Interface 204 may provide the reformatted data to operating system 204 for presenting to legacy application 202, or interface 206 may provide the reformatted data directly to legacy application 202.

API 208 may include a set of executable instructions that legacy application 202 may utilize to access interface 206. For example, API 208 may include instructions that define behaviors of functions accessed by legacy application 202. These functions may be used by legacy application 202 to make calls to interface 206. For example, legacy application 202 may update data by calling a function defined by API 208.

Non-legacy application 210 may be an application designed for use in ICE 100. For example, non-legacy application 210 may be a collaborative database application configured to allow multiple users to simultaneously interact with a database using multiple clients. Embodiments of non-legacy application 210 may interact with other components of ICE 100, such as server 120, directly or indirectly using interface 206. For example, non-legacy application 210 may use authentication information provided by interface 206 to allow communication with server 120. Embodiments of non-legacy application 210 may include computer-executable instructions and/or data that may be stored in local persistence 212. Non-legacy application 210 is shown residing within client 102 in FIG. 2; however, in other embodiments, legacy application 210 can reside elsewhere in ICE 100, e.g., in server 120, client 104/106, etc.

Local persistence 212 may include one or more tangible non-transitory computer readable storage media for storing instructions and/or data on clients 102. Instructions and/or data stored by local persistence 212 may be received from server 120, legacy application 202, and/or non-legacy application 210. For example, in an embodiment, local persistence 212 may serve as an instruction or data cache on behalf of server 120 by storing instructions/data on client 102.

By way of example and referring to FIG. 2, interface 206 may represent a shared file to legacy application 202 as a file on a local file system of client 102. A shared file may be associated with metadata, which may identify file creation information (e.g., date, time, etc.), file permission information (e.g., read, write, delete, update, rename, etc.), file version information, file content information, file categorization information, file size information, etc. Metadata may also include tags, ratings, comments, etc., for files. Metadata may further include information on access control policies (e.g., based on geographical region, licensing permissions, local laws, etc.), time increments (e.g., allowing file access for a determined time interval), events (e.g., allowing sharing once a determined event occurs, such as a valid login event), etc.

In an embodiment, metadata associated with the shared file may be incompatible with legacy application 202. Incompatible metadata may be represented by interface 206 as one or more separate files in a legacy compatible format, e.g., as a separate file in the same directory as the shared file on the local file system 220. In contrast, the same shared file may be represented to non-legacy application 210 as a shared file with embedded metadata since the non-legacy application may able to interpret embedded metadata. For example, non-legacy application 210 may be a browser GUI compatible with the additional metadata information, and the browser GUI may display the additional metadata information to a user. Embodiments can be configured to allow merging metadata between non-legacy applications and legacy applications. For example, metadata compatible with server 120 may be merged with metadata compatible with legacy application 202. When non-legacy metadata is merged with legacy compatible metadata, the non-legacy metadata, for example, may be converted to legacy file system meta-data compatible with file system 220 and that can be interpreted by legacy application 202.

Exemplary Processing

Figure 3:
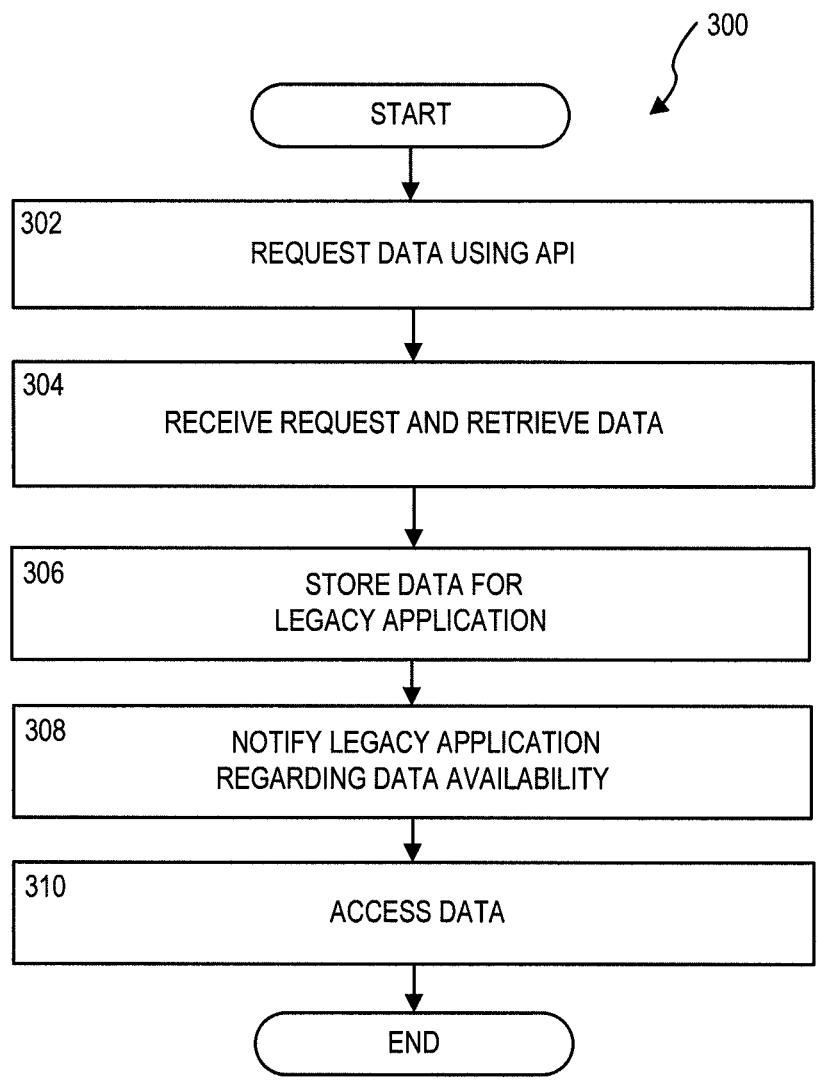
FIG. 3 illustrates exemplary processing for providing data to a legacy application according to an exemplary embodiment.

FIG. 3 illustrates exemplary processing for providing data to a legacy application according to an exemplary embodiment. Legacy application 202 may request data using API 208 (block 302). For example, a user of client 102 may wish to analyze signal processing data using a standalone TCE, such as the MATLAB™ programming language. In this example, the MATLAB language may be a legacy application configured for use on a standalone computing device such as a laptop, iPhone™, etc. The MATLAB language may request signal processing data via API 208, and API 208 may forward the request to interface 206. In an embodiment, API 208 may reformat the request into a form compatible with interface 206 before forwarding the request to interface 206. Alternative embodiments may not require reformatting of the request depending on particular configurations of client 102.

Interface 206 may receive the request from API 208 and retrieve the data from server 120 (block 304). Embodiments may allow interface 206 to pull content from server 120 or server 120 may push content to interface 206 in response to a request. Data received from server 120 may be stored in local persistence 212 on behalf of interface 206 and/or server 120 (block 306). Information stored in local persistence 212 may be made available to software and hardware operating in client 102. For example, information stored in local persistence 212 may be presented to software and/or hardware on client 102 as a local files system. Information presented as a local file system may allow legacy application 202, operating system 204, and/or other components on client 102 to access the information without requiring modifications to software or hardware operating on client 102.

Interface 206 may notify legacy application 202, via API 208, that received data is available for access (block 308). Legacy application 202 may access the data stored in local persistence 212 using a local file system, such as file system 220 (block 310). Embodiments can be configured to allow legacy application 202 to interact with file system 220 directly or using operating system 204. Embodiments can be configured to allow local persistence 212 and/or file system 220 to provide legacy application 202 with multiple views of information, e.g., data, received from server 120. The multiple views can be provided to legacy application 202 without requiring modification of legacy application 202 or other changes to client 102, such as changes to client 102 that vary by format or type of data received from server 120.

Exemplary Interface

Figure 4:
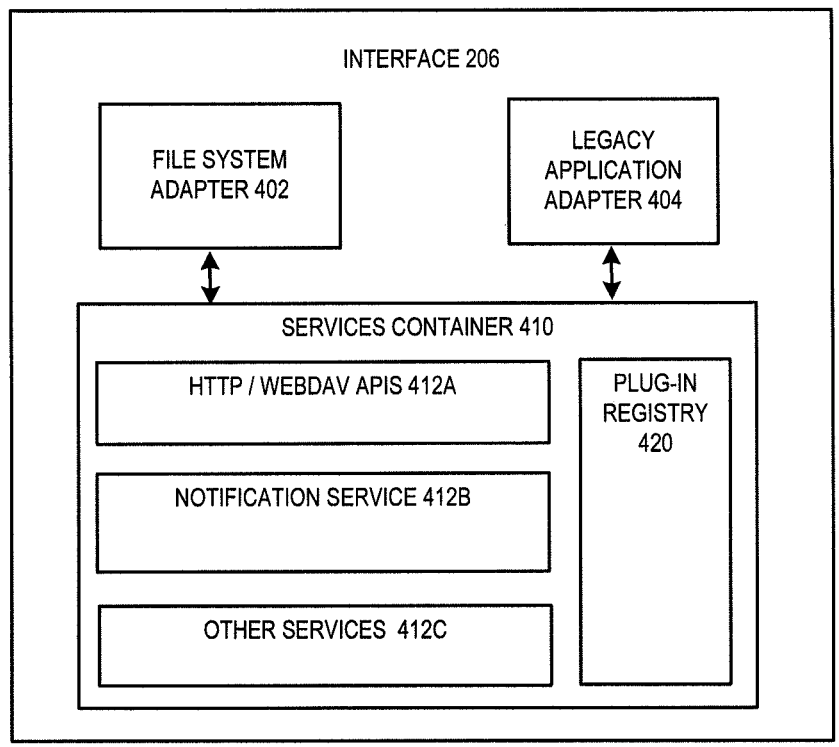
FIG. 4 illustrates an example schematic diagram of an interface configured to practice an exemplary embodiment.

FIG. 4 illustrates an example schematic diagram of components that can be included in interface 206 for practicing an exemplary embodiment. Interface 206 may include file system adapter 402, legacy adapter 404, and services container 410.

File system adapter 402 may allow operating system 204 and interface 206 to interact. For example, interface 206 may receive data and/or instructions from server 120. Interface 206 may provide the data/instructions to adapter 402, which may be implemented in code that when executed allows for interaction with interface 206. File system adapter 402 may in turn provide the data/instructions to operating system 204 as files that are compatible with legacy application 202. File system adapter 402 may also receive data/instructions from operating system 204 and may provide the data/instructions to interface 206.

Legacy adapter 404 may allow interface 206 to interact with API 208 for facilitating interactions with legacy application 202. In an embodiment, legacy adapter 404 may include code that when executed provides protocols that allow commands to be communicated between API 208 and interface 206. For example, legacy adapter 404 may receive a data update command from legacy application 202 through API 208. Legacy adapter 404 may provide the command to interface 206 and interface 206 may provide the command to a non-legacy application, such as a non-legacy application operating on client 102, 104, 106 or server 120.

Services container 410 may contain one or more services 412A-412C (collectively services 412). Services container 410 may further include plug-in registry 420. For example, services container 410 may be a Java Application Server that provides underlying services handling, transaction and state management, multithreading, resource pooling, and other complex low-level tasks. Interface 206 operating alone or in conjunction with other components on client 102, such as API 208, may allow client 102 to take advantage of collaborative services included in services container 410 without requiring modifications to legacy application 202, operating system 204, etc.

Services 412 may be software components that provide functionality used by file system adapter. 402 and/or legacy application adapter 404. These services may include but are not limited to, for example, Hypertext Transfer Protocol (HTTP)/Web-based Distributed Authoring and Versioning (WebDAV) APIs service 412A, a notification service 412B, and/or other services 412C.

The HTTP/WebDAV APIs service 412A may provide functionality for client 102 to communicate with server 120 using the HTTP and WebDAV communication protocols. For example, service 412A may provide functionality for client 102 to utilize WebDAV capabilities for creating, changing, moving, etc., documents on server 120. In an embodiment, other communication protocols may be used instead of service 412A, such as, but not limited to, File Transfer Protocol (FTP).

Service 412B may monitor for notifications, such as updates to files that client 102 is sharing with other clients 104, 106 and/or server 120. File updates may be monitored using update notifications in an embodiment. For example, service 412B may asynchronously receive update notifications with respect to instructions and/or data shared among clients 102. Service 412B may adjust content of local persistence 212 on a particular client based on the update notifications. Notifications may be received locally from API 208 and/or remotely from server 120 or another client. In the case of a notification from API 208, service 412B may provide a notification to server 120 indicating that instructions and/or data have been modified on client 102, for example by legacy application 202. In the case of a notification from server 120, server 120 may push update notifications to service 412B. Alternatively, service 412B may poll server 120 for update notifications. Notifications may further be compatible with characteristics or parameters, such as characteristics/parameters that indicate a notification should be propagated to one or more users. For example, an embodiment may be configured such that when a notification is received at an interface of a first client, the notification should be shared with a second client having permission to collaboratively work with the first client on a project.

In an embodiment, service 412B may propagate updates to client 102 based on rules defining conditions for accepting an update. For example, service 412B may utilize a rule to automatically accept changes from a specified user, such as a user associated with a remote client. Another rule may enable accepting an update when the update passes one or more tests, for example, an authenticity test with respect to the source of the update. Yet another rule may cause service 412B to search for updates based on criteria, such as user provided criteria. Still another rule may accept an update when a user agrees to the update, e.g., by responding to a prompt associated with the proposed update. An additional rule may enable accepting all updates in real-time without notifying a user and/or without requiring that the user accept each update individually. Rules used with exemplary embodiments may be pre-defined or user-defined. Embodiments can support local rule storage on a respective client or remote rule storage with respect to a client, e.g., rule storage provided by server 120.

In addition to service 412A and service 412B, services container 410 may include other services 412C providing various functionality to client 102. For example, services 412C may include functionality for rating files, searching files, encrypting files, etc. Services 412 may also enable non-legacy application 210 to communicate with server 120. Services 412 can modify how instructions and/or data are presented to non-legacy application 210 based on capabilities of non-legacy application 210. For example, services 412 may determine the capabilities and/or a format in which instructions and/or data should be presented to non-legacy application 210. Services 412 may use the determined capabilities and/or format for allowing non-legacy application 210 to communicate with server 120.

Plug-in registry 420 may provide a plug-in architecture for services 412A-412C. Plug-in registry 420 may register and/or deregister services 412 as the services are added and/or removed, respectively. Embodiments may allow that a specific service 412 may be tailored for specific applications. Accordingly, a specific service 412 may be added or removed from plug-in registry 420 depending on whether the application associated with the specific service 412 is used with interface 206.

Services 412 may be adaptively added or removed from container 410 based on factors, such as the capabilities of hardware or software of client 102, processing loads on client 102, input/output bandwidth of connections to client 102, etc. In an embodiment, adding or removing of services may be governed by adaptive events. For example, server 120 may determine that client 102 needs to provide additional functionality. Accordingly, server 120 may dynamically transfer code for services 412 to client 102 and the code may be stored in local persistence 212. Client 102 may have access to the additional functionality by executing the transferred code. Authorizations for services on client 102 may be governed using licensing techniques that can be administered locally via respective clients 102 or remotely via server 120 or another device, e.g., a remote client.

Embodiments can allow client 102 to issue a legacy command to ICE 100, have the command processed by devices in ICE 100, and have a collaboration environment produced result returned to client 102. Client 102 can convert the collaboration environment compatible result into a result that is compatible with legacy application 202.

Exemplary Processing Techniques

Figure 5:
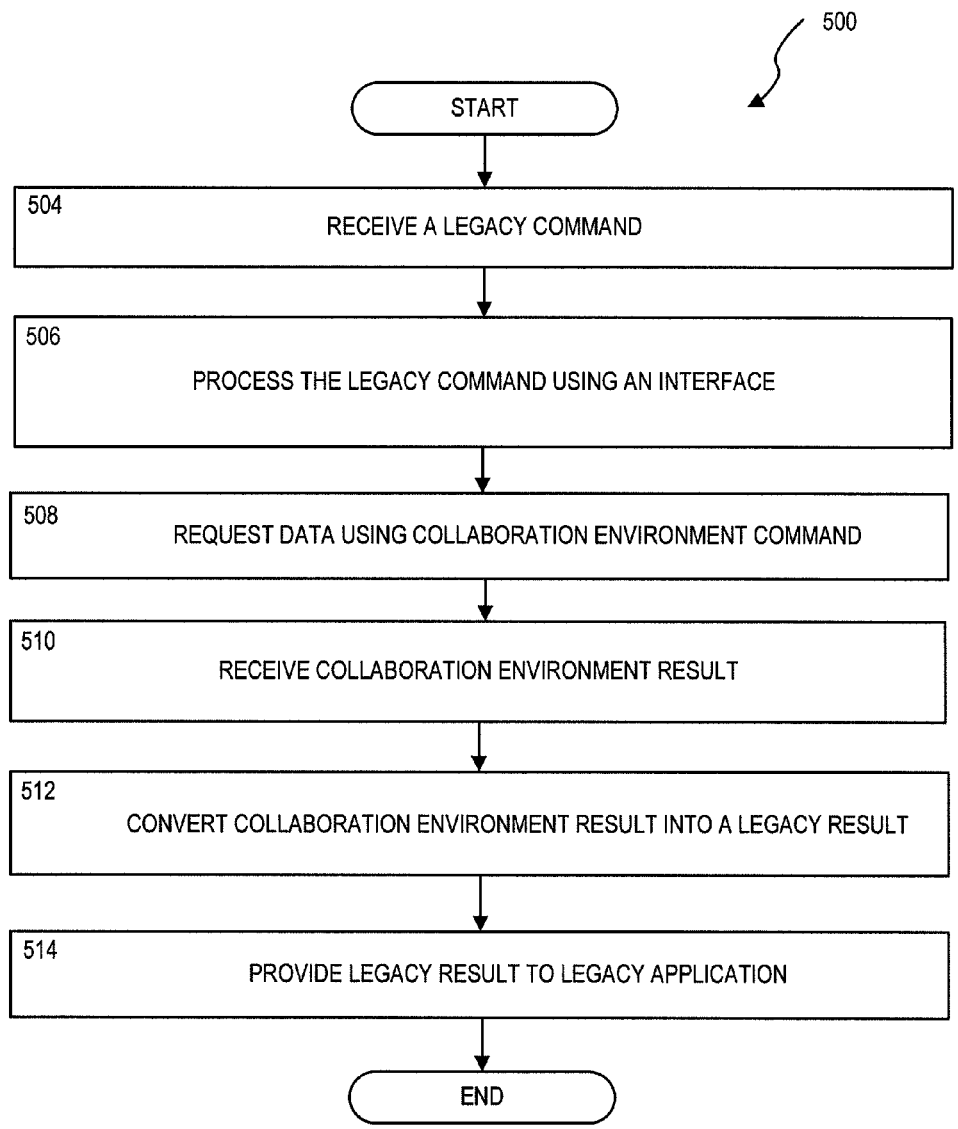
FIG. 5 illustrates exemplary processing for providing a legacy result according to an exemplary embodiment.

FIG. 5 illustrates exemplary processing 500 for providing collaboration environment results to client 102. Interface 206 may receive a legacy command from legacy application 202 (block 504). For example, API 208 may receive a command for processing a data segment. The command may be for a processing operation that is not locally available on client 102. In an embodiment, the legacy command may be received by legacy adapter 404 from API 208. The received legacy command may be for data that is stored in a format compatible with client 102 but that is incompatible with server 120. For example, if legacy application 202 is a TCE, the TCE may request locally stored data in a legacy-TCE compatible format. Here, the legacy-TCE format may be incompatible with a command that is in collaborative-TCE format, such as a TCE command that is used for distributed computing tasks in a networked environment (e.g., cloud-based computing operations).

Interface 206 may process the legacy command and may transform the command from a legacy-compatible command into a collaboration environment command compatible with server 120 (block 506). A collaboration environment command may be a command compatible with server 120, but incompatible with a legacy application on client 102. Transforming the command into a collaboration environment command may include determining a reference to data stored on server 120 corresponding to the data requested by the legacy-compatible command. For example, interface 206 may recognize that a request for data on client 102 corresponds with a shared file stored by server 120 even though legacy application 202 is configured in a way that indicates the data is stored locally on client 102 in a legacy-compatible format. Interface 206 may request the data from server 120 using the collaboration environment command (block 508). Requesting the data may be done by providing the request to server 120 either directly or indirectly, for example, through network 110.

Interface 206 may receive the data from server 120. For example, the requested data may be a collaboration environment result that was produced when a command was executed in ICE 100 (block 510). In an embodiment, server 120 may be capable of operating on collaboration results that include metadata describing characteristics of the collaboration result. Server 120 may use the metadata for further processing the collaboration result or for providing the result to client 102. Server 120 may send the collaboration result, including the metadata, to client 102 via interface 206. Interface 206 may process the collaboration result and may extract or transform metadata that is incompatible with a legacy application on client 102. Interface 206 may convert the collaboration result into a legacy result, where the legacy result is compatible with client 102 and one or more legacy applications operating on client 102 (block 512). In situations where interface 206 provides metadata to legacy application 202, on client 102, interface 206 may transform the metadata into a format compatible with legacy application 202. Interface 206 may provide the legacy result to legacy application 202 (block 514).

Figure 6:
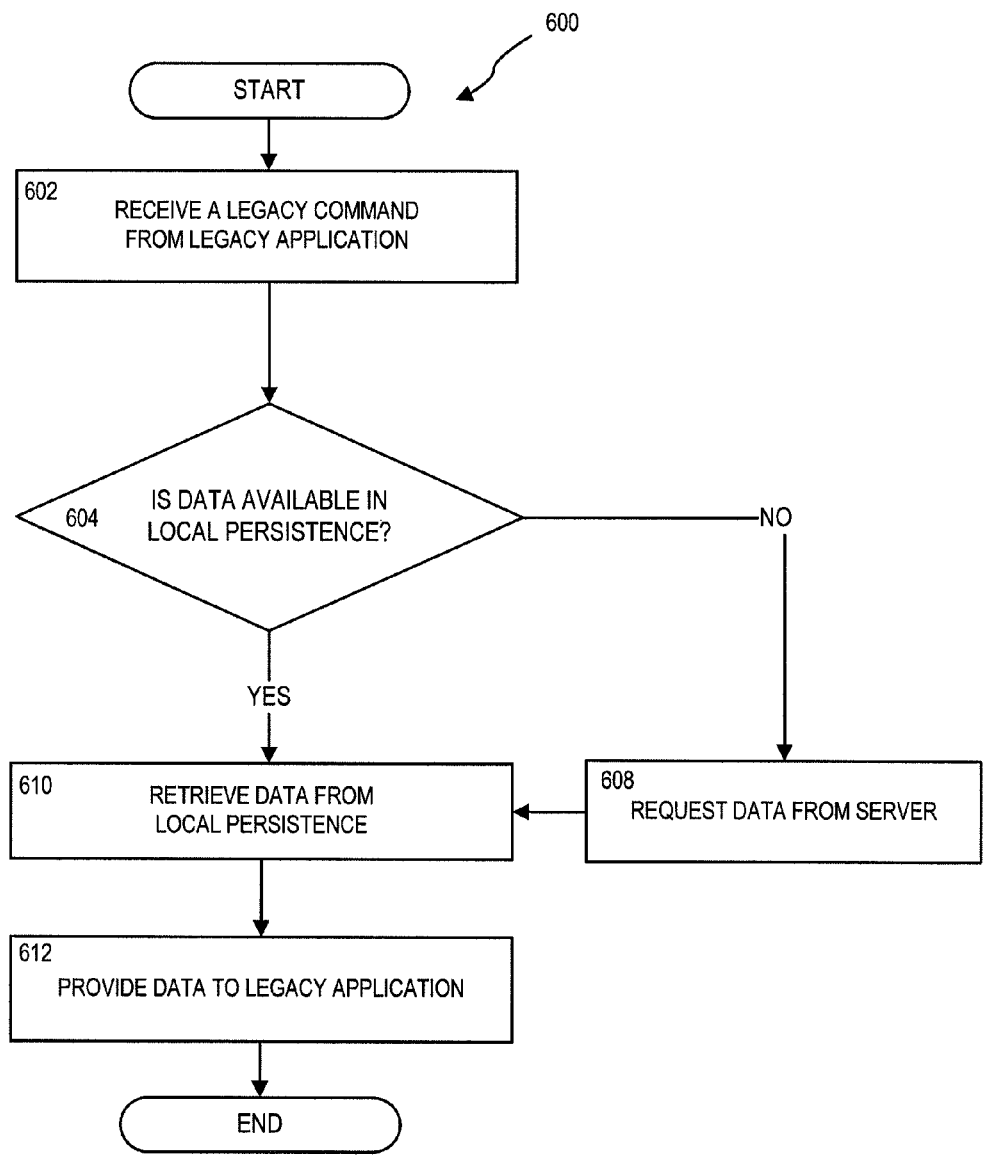
FIG. 6 illustrates exemplary processing for providing data to a legacy application according to an exemplary embodiment.

FIG. 6 illustrates exemplary processing 600 for providing data to legacy application 202 according to an exemplary embodiment. Interface 206 may receive a legacy command from legacy application 202 (block 602). The legacy command may be a command for data and may be received by legacy adapter 404 from API 208. For example, the legacy command may be a request to read an expression prompted by a Java Remote Method Invocation (RMI) request to execute the expression. Interface 206 may determine if requested data is available in local persistence 212 (block 604). In an embodiment, interface 206 may use notification service 412B to determine if the data is available in local persistence 212. When the data is not available in local persistence 212 (NO—block 604), interface 206 may request the data from server 120 (block 608). In an embodiment, interface 206 may request the data using exemplary processing 500 and may store the retrieved data in local persistence 212 or may provide the retrieved data to legacy application 202 (block 612). In contrast, when data is available in local persistence 212, block 604, the data may be retrieved from local persistence 212 (block 610).

Figure 7:
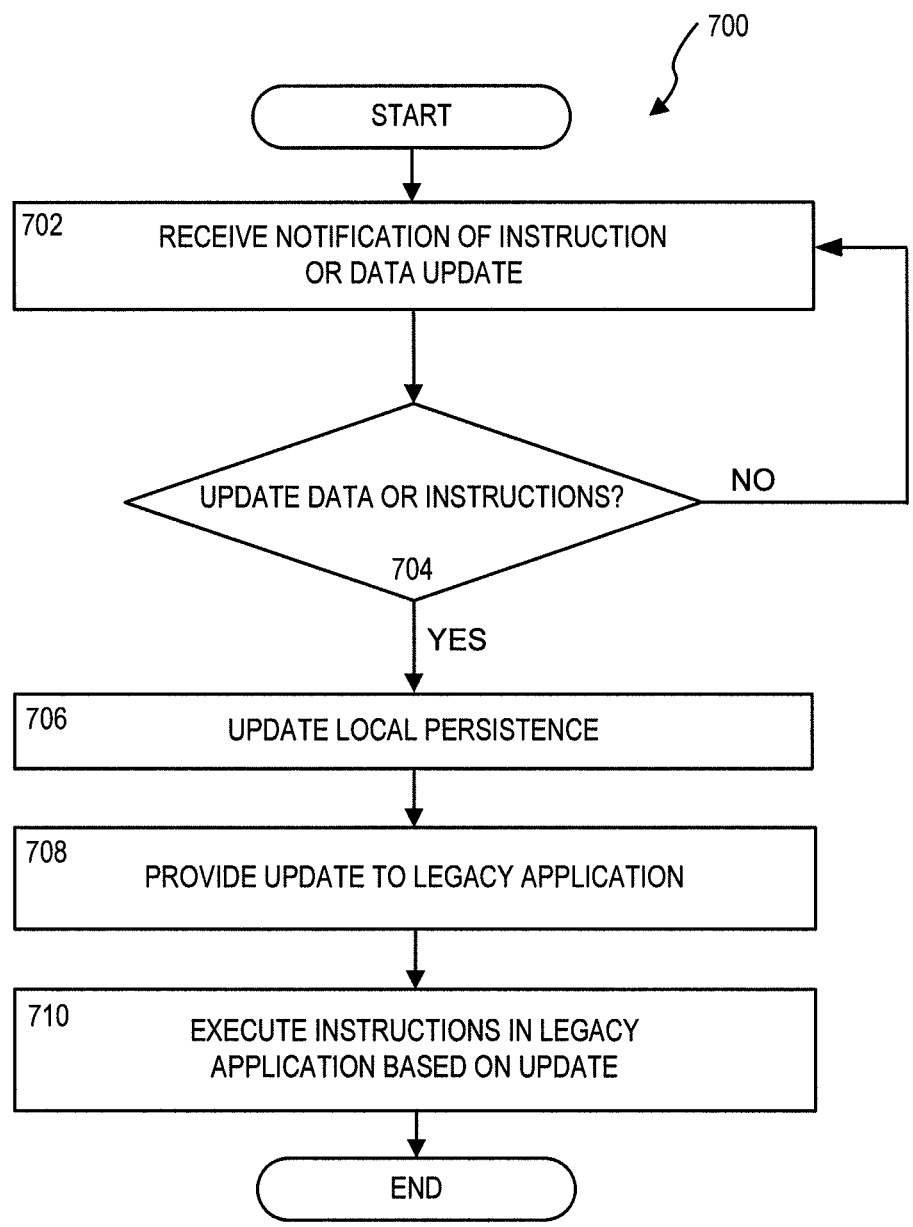
FIG. 7 illustrates exemplary processing for handling notifications according to an exemplary embodiment.

FIG. 7 illustrates exemplary processing 700 for providing notifications according to an exemplary embodiment. Processing notifications may enable interface 206 to ensure client 102 has current copies of information shared by server 120.

Interface 206 may receive a notification of an update associated with instructions and/or data from server 120 (block 702). For example, in an embodiment, notifications may be received based on service 412B. Interface 206 may determine whether instructions and/or data should be updated (block 704). In an embodiment, the determining may be based on the rules described in connection with service 412B, for example, rules describing criteria for automatically accepting updates. If data/instructions should be updated (YES-block 704), client 102 may update a stored version of the data/instructions in local persistence 212 (block 706). Client 102 may update data/instructions by replacing a stored copy of data/instructions in its entirety or by modifying portions of stored data/instructions that have changed with respect to an earlier version of the stored data/instructions. In an embodiment, interface 206 may download the updated instructions and/or data from server 120 and update local persistence 212.

Interface 206 may provide the updated instructions and/or data to legacy application 202 (block 708), and legacy application 202 may execute the updated instructions and/or use data based on the updated instructions and/or data (block 710).

Exemplary Server

Figure 8:
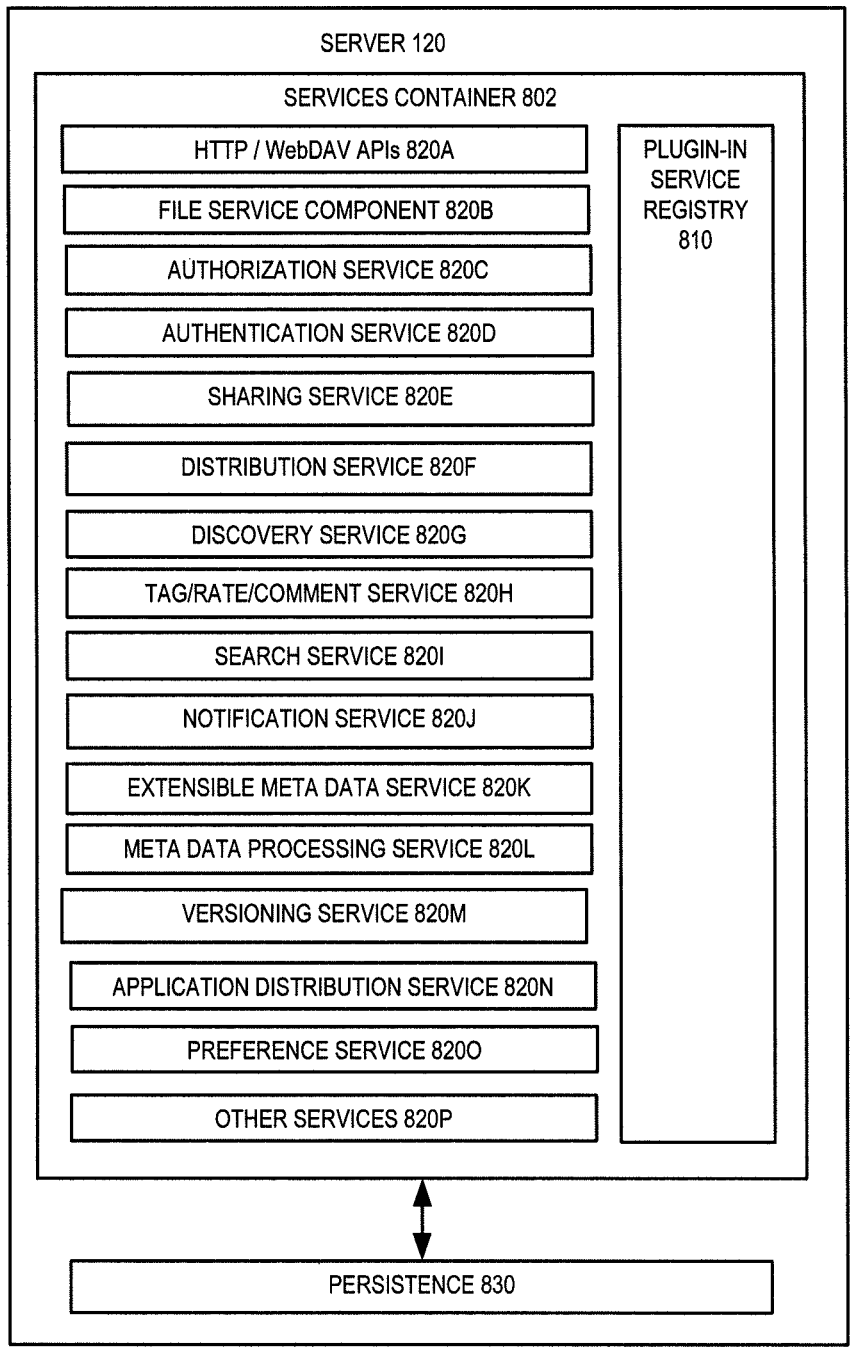
FIG. 8 illustrates an example schematic diagram of a server configured to practice an exemplary embodiment.

FIG. 8 illustrates a schematic diagram of server 120 configured to practice an exemplary embodiment. Server 120 may include services container 802 and persistence 830. Services container 802 may be in communication with persistence 830. Persistence 830 may include tangible non-transitory storage media for storing instructions and/or data.

Services container 802 may be similar to services container 410 of client 102. Services container 802 may include a plug-in service registry 810 and various services 820A-820S (collectively referred to as services 820). Plug-in service registry 810 may include code for registering one or more services 820 contained within services container 802.

Services may include executable code for performing particular operations on server 120. Examples of services 820 that can be used on server 120 are, but are not limited to, an HTTP/WebDAV APIs service 820A, a file service component 820B, an authorization service 820C, authentication service 820D, sharing service 820E, distribution service 820F, discovery service 820G, tag/rate/comment service 820H, search service 820I, notification service 820J, extensible metadata service 820K, metadata processing service 820L, versioning service 820M, application distribution service 820N, preference service 820O, and/or other services 820P. Services 820 may be similar to services 412 of client 102. Services 412 used in client 102 may also be used in server 120 to provide similar functionality to server 120 and vice versa.

HTTP/WebDAV APIs service 820A may provide functionality for server 120 to respond to HTTP requests. HTTP/WebDAV APIs service 820A may also provide functionality for server 120 to enable Web-based Distributed Authoring and Versioning. Support may also be provided via HTTP/HTTPS for server 120 to be crawled or indexed by search engines. Access permissions given to search engines may be set by a user or an administrator or programmatically using executable instructions.

File service component 820B may provide functionality for server 120 to manage files stored in persistence 830. File service component 820B may include functionality for executing operations on files, such as but not limited to create, read, update, delete, list, search.

Authorization service 820C may make determinations based on policies. Service 820C may be queried by component 820B to determine if an operation should be completed. For example, service 820C may determine whether a user may access instructions and/or data. In response to a query, service 820C may examine permissions associated with the query and make a policy determination based on the permissions. Service 820C may include a permissions store, which may be a storage containing permissions of users to access instructions and/or data.

Authentication service 820D may authenticate client 102. Authentication may be based on the identity of a user of client 102, based on the identity of an application on client 102, based on the identity of interface 206 on client 102, etc. Authentication may be performed based on a password, a security token, biometric information, etc.

Sharing service 820E may provide functionality to define how information is shared by server 120. Users of client 102 may use service 820E to define with whom a file is shared, for example, anyone, a group of people, a single person, etc. Sharing may also be expressed as time bounded. A file and its contents may be visible only before a date, after a date, between dates, etc. Alternatively, the file and its contents may be invisible before, after or between dates.

Distribution service 820F may distribute data between server 120 and client 102. Service 820F may utilize non-standard communication protocols to distribute data. For example, updated instructions and/or data may be transmitted to client 102 using a proprietary communication protocol of service 820F.

Discovery service 820G may discover clients 102 and/or other servers to which server 120 may communicate. For example, service 820G may monitor network 120 to determine when any client 102 or server 120 is added or removed from network 112. Tag/rate/comment service 820H may allow users to tag files, rate files, and/or comment on files. Search service 820I may provide functionality for searching of instructions and/or data shared by server 120. Service 820I may allow searching by name, ownership, tags, ratings, comments, metadata, etc.

Notification service 820J may monitor for update notifications from clients 102 and/or notify clients 102 of updates. For example, service 820J may notify clients 102 that are associated with a shared file when an update notification is received for the shared file. The updated file may be accessible to devices and users associated with the file when the update notification is received. For example, users may be provided with substantially real-time access (e.g., without a delay that inconveniences a user) to updated files once the notification is received.

Extensible metadata service 820K may provide support for metadata to be extensibly applied to the contents of server 120. Extensibly applying metadata may permit metadata describing data to be added or removed with minimal impact on the functionality of server 120, for example, without recoding or restarting server 120. Metadata may also be added to data without modifying the underlying data.

Metadata processing service 820L may provide metadata processing during a metadata processing phase on server 120. File access operations may pass through a metadata processing phase for allowing server 120 to perform extensible policy based processing of content. Processing may be triggered by create, read, update, delete, and/or list operations. Pre and post event meta-data based processing can occur at various times, for example, before or after a save operation. Metadata processing may also be performed based on a manual request for a user, for example, a request from a user to extensibly add metadata.

Versioning services 820M may enable users to view and open previous versions of files stored by server 120. In an embodiment, contents of a previous file version may be viewed or executed without making the previous version an active file in ICE 100. Similarly, versioning services 820M may enable previous versions of instructions to be run in legacy application 202 without making the previous instructions an active version of instructions operating in ICE 100. Allowing access to previous versions of files, instructions, etc., may enable, for example, sandboxing operations (e.g., testing) to be performed.

Versioning services 820M may also enable version and cloud storage access. Version and cloud storage access may permit server 120 to use copy on write versioning or time-travel-navigation versioning. Copy on write versioning may prevent server 120 from creating a new version of a file until the existing file is modified. Time-travel-navigation versioning may enable the use of a user interface that allows users to traverse changes in different versions of a file based on time values.

Versioning services 820M may also govern collisions between contents of shared files in server 120. A collision may occur when two conflicting updates are simultaneously received by server 120. Collisions may be resolved by a "last in wins" strategy and/or via another strategy within server 120, e.g., a scoring metric applied to users, client locations, etc. Folders may be versioned as well as files. Versioning folders may be relevant for legacy application 202 which may view a folder as a package of files.

Application distribution service 820N may distribute applications to client 102. For example, service 820N may determine client 102 has an out-dated version of an application and may distribute the updated application to client 102. Preference service 820O may store user preferences. For example, service 820O may store customizable settings on behalf of users.

Other services 820P may include, for example, a chat service that allows users to participate in chat sessions with the author who has modified the contents of a file.

Server 120 may also be aware of special types of files, for example, Open Services Gateway initiative (OSGI) bundles, zip files with extended manifest information, etc. Special file types can be arranged in packages or individually. Awareness of special types of packages files may allow the contents of these packages to be utilized as though they were unpackaged. Furthermore, the contents of these special files may be interpreted based on services which allow server 120 to call out to these plug-ins for the handling of contents of the package files.

Exemplary embodiments of ICE 100 can be configured to allow client 102 to share information with other clients, e.g., clients 104 and 106. For example, client 102 may have legacy data and legacy instructions stored in local persistence 212. Client 102 may share the legacy data and/or instructions with client 104 in response to a request received from client 104 or another device operating on behalf of client 104, such as server 120. Interface 204 may convert the legacy data and/or instructions from a legacy format compatible with client 102 into a non-legacy format compatible with client 102 or server 120. Embodiments of ICE 100 may allow client 102 to share data and/or instructions using a shared folder consistent with aspects of the invention.

Exemplary Processing Techniques

Figure 9:
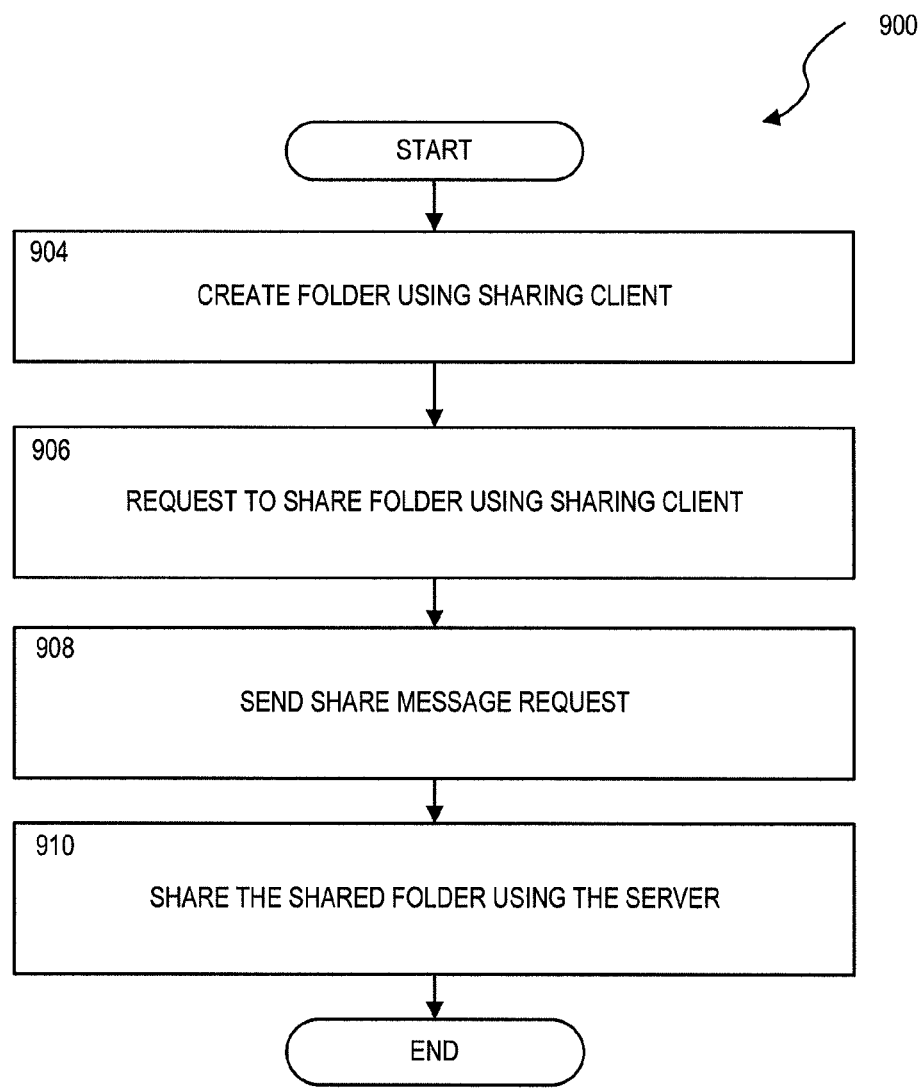
FIG. 9 illustrates exemplary processing for creating a shared folder according to an exemplary embodiment.

FIG. 9 illustrates exemplary processing 900 for creating a shared folder according to an exemplary embodiment. Client 102 may share instructions and/or data for consumption by legacy application 202 on another client 104 using exemplary processing 900.

Client 102 may create a folder (block 904). Client 102 may move files into the created folder using, for example, a local copy command. Files in the folder may be compatible with legacy application 202.

Client 102 may request to share the folder with one or more clients 104 and/or 106 (block 906). A user of client 102 may specify authorization metadata for the folder or files within the folder or metadata may be generated programmatically based on characteristics of the share request. For example, authorization metadata may also be generated programmatically based on a configuration, a permission, etc. Authorization metadata may specify, for example, read and write privileges for particular users, groups, files, etc.

The sharing client may send a share message request (908). The share message request may be routed to server 120. Server 120 may process the request and may share the shared folder with the one or more consuming clients 104 and/or 106 (block 910). In an embodiment, a user of client 102 may specify clients 104/106 that can access the shared folder. In another embodiment, clients 104/106 may be programmatically identified based on settings associated with client 102 (e.g., a permission file). Server 120 may apply the authorization metadata specified by client 102 to the shared folder before making the folder available to clients 104/106. For example, server 120 may request one or more consuming clients 104 and/or 106 store the authorization metadata and enforce permissions set by the authorization metadata.

Figure 10:
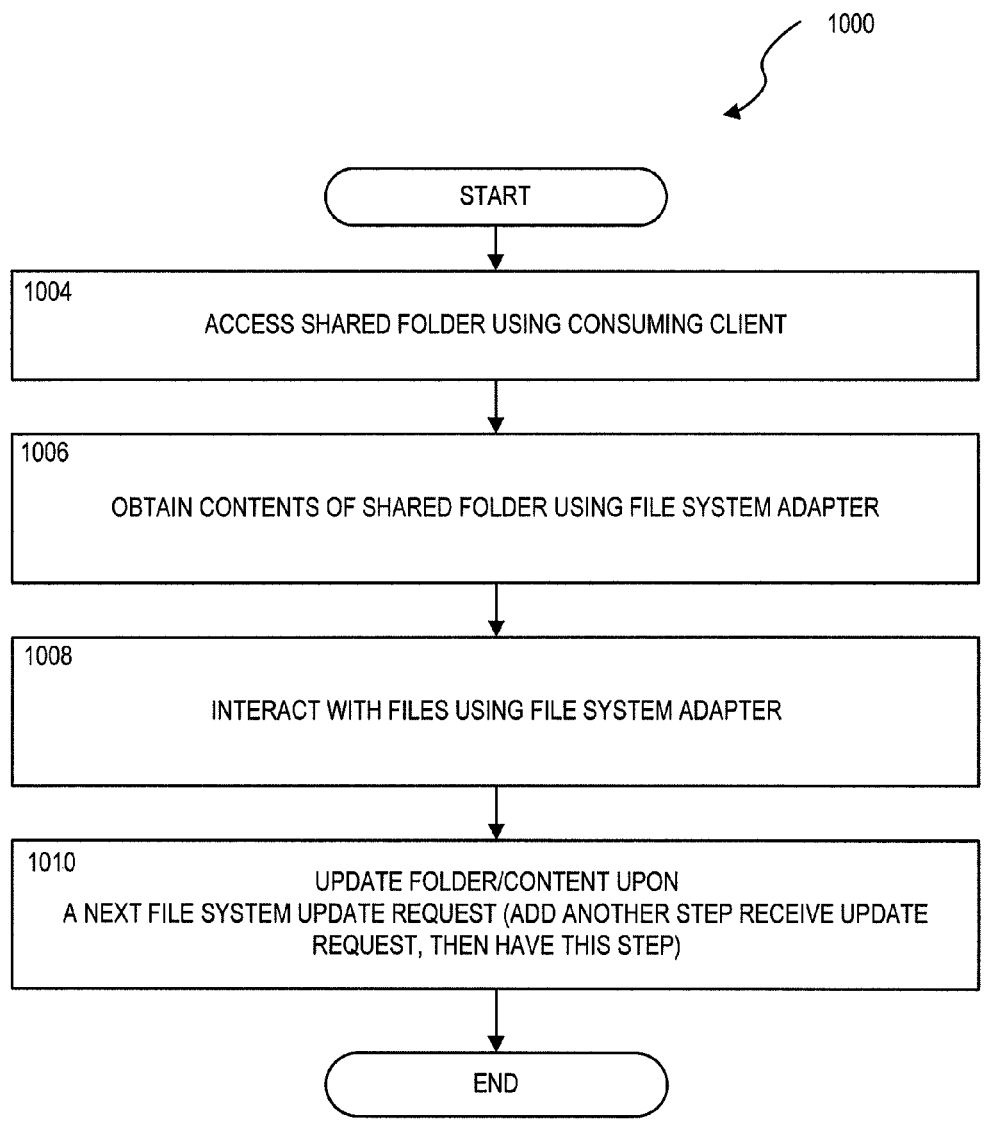
FIG. 10 illustrates exemplary processing for consuming a shared folder according to an exemplary embodiment.

FIG. 10 illustrates exemplary processing 1000 for consuming a shared folder according to an exemplary embodiment. Exemplary processing 1000 may be used by client 104 and/or 106 when consuming a folder shared by client 102. For example, clients 104/106 may run a version of legacy application 202 that may be configured to consume the contents of the shared folder. The version of legacy application 202 may reside locally on clients 104/106 or clients 104/106 may remotely access legacy application 202 operating on client 102.

Consuming client 104 and/or 106 may request to access a folder that has been created and shared by client 102 (block 1004). File system adapter 402 of interface 206 on clients 104/106 may obtain the contents of the shared folder along with metadata from server 120 (block 1006). File system adapter 402 may utilize exemplary processing 600 for providing data to legacy application 202.

Clients 104/106 may read or interact with the files through file system adapter 402 (block 1008). Clients 104/106 may open and/or modify the files. Interaction by clients 104/106 may comply with authorization meta-data set by client 102. For example, metadata may allow clients 104/106 to modify only selected files shared from client 102. When clients 104/106 interact with the shared files, attempting to modify a file not in the group of selected files may produce an error message.

Updates to the files may be propagated to consuming client 104 and/or 106 during an update request (block 1010). Updating of files may utilize exemplary processing 700 for notifications.

Exemplary Federated System

Figure 11:
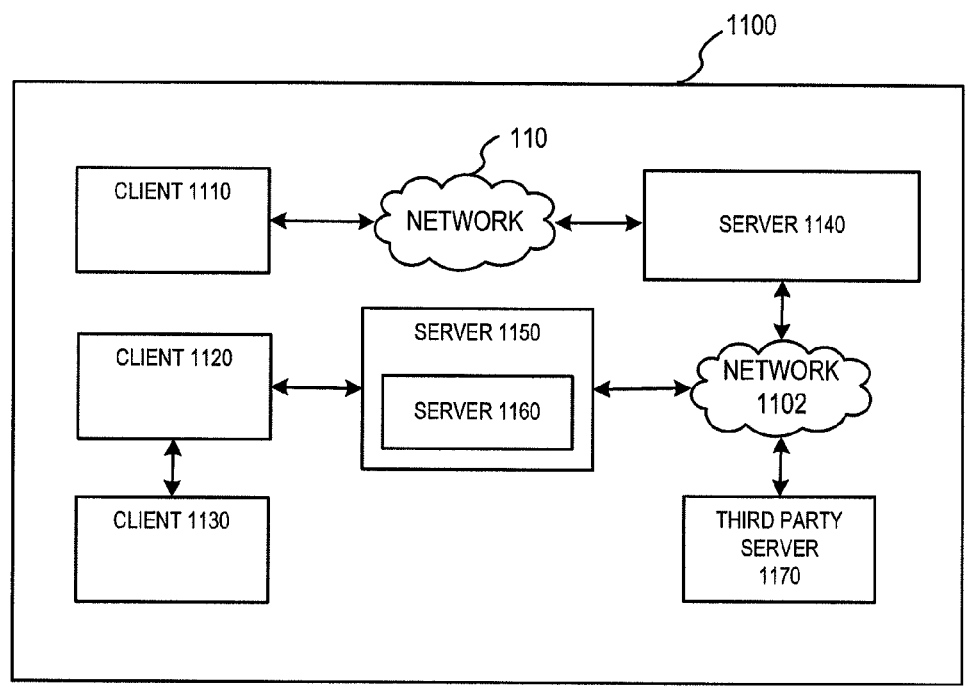
FIG. 11 illustrates an example schematic diagram of a federated system configured to practice an exemplary embodiment.

FIG. 11 illustrates a schematic diagram of a federated system configured to practice an exemplary embodiment. A federated system may be a collection of disparate systems which are presented through an API as though the disparate systems were a single system. The federated system may include federated ICE 1100. Federated ICE 1100 may be an embodiment of ICE 100 in which separate clients and servers may be represented as a single server. Federated ICE 1100 may include clients 1110, 1120, 1130, servers 1140, 1150, and 1160, third party server 1170, and networks 110 and 1102.

Clients 1110, 1120, and 1130 may be similar to client 102 as described in FIGS. 2 and 4. In some embodiments, clients 1110, 1120, and 1130 may use different services 412 for interface 206 than are used and/or described in connection with client 102. In particular, services container 410 of interface 206 may include Federation/Peer-to-Peer (P2P) Services and third Party Federation Services.

Federation/P2P services may permit client 1120 and client 1130 to act as peers and form a peer-to-peer connection. Peer-to-peer connections may be formed by manual configuration or formed via auto-discovery. Client 1120 and client 1130 may communicate directly with one another as peers using a peer-to-peer connection. Client 1120 and client 1130 may also utilize a peer-to-peer connection to appear as a single federated client to other clients and/or servers.

Third Party Federation services may permit third party services to be federated into federated ICE 1100. Third party services may include Google docs, Amazon S3, Drop-box, etc.

In federated ICE 1100, one or more servers 1140, 1150, 1160 may also be nested, chained, cascaded, etc. For example, server 1160 may be nested within server 1150.

Federated ICE 1100 may also permit content stores to be accessed by Uniform Resource Locators (URLs). For example, forms of federation URLs may refer to other servers 1140, 1150, and 1160 or refer to the contents of a single file and directory via HTTP or FTP based URLs.

Exemplary Distributed System

Figure 12:
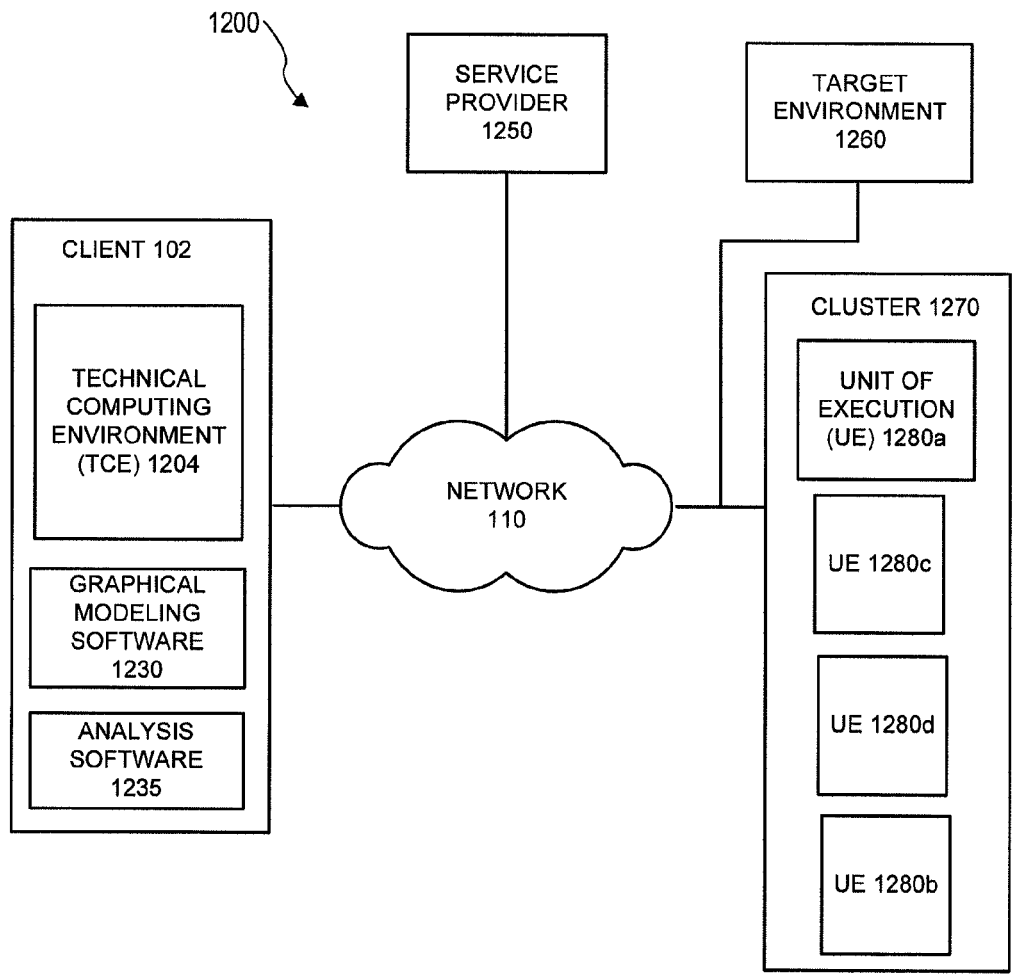
FIG. 12 illustrates a distributed environment that may be configured to practice an exemplary embodiment.

FIG. 12 illustrates a environment 1200 that may be configured to practice an exemplary embodiment. Referring to FIG. 12, environment 1200 may include a client 102, network 110, service provider 1250, target environment 1260 and cluster 1270. Note that the environment illustrated in FIG. 12 can be an example of a distributed environment that may be used. Other distributed environments may include additional devices, fewer devices, or devices in arrangements that differ from the arrangement of environment 1200.

In an embodiment, client 102 may include TCE 1204, graphical modeling software 1230 and analysis software 1235 as legacy application 202 and/or non-legacy application 210. Modeling software 1230 and analysis software 1235 may be graphical, textual or a hybrid that includes both textual and graphical capabilities/features. Modeling software 1230 may include computer-executable instructions that allow, e.g., a user to build and/or execute a model. For example, modeling software 1230 may allow a user to build and execute a time-based model, a state-based model, an event-based model, a dataflow-based model, etc. Modeling software 1230 may further support generating code from executable graphical models.

Analysis software 1235 may include computer-executable instructions that allow information in a model to be evaluated. Evaluating a model may include generating tests for the model that satisfy model coverage objectives, user-defined objectives, etc. In addition, evaluating a model may include proving various model properties and generating examples of violations of these properties. Moreover, evaluating a model may include performing model verification and/or validation operations. In an exemplary embodiment, analysis software 1235 may include the Simulink® Design Verifier software which is available from The MathWorks.

Network 110 may include any network capable of exchanging information between entities associated with the network, including, for example, client 102, service provider 1250, target environment 1260 and cluster 1270. Network 110 may include various network devices, such as, for example, routers, switches, firewalls, servers, etc. Portions of network 110 may be wired (e.g., using wired conductors, optical fibers, etc.) and/or wireless (e.g., free-space optical (FSO), radio frequency (RF), acoustic transmission paths, etc.). Portions of network 110 may include a substantially open public network, such as the Internet. Portions of network 110 may include a more restricted network, such as a virtual private network (VPN). It should be noted that implementations of networks and/or devices operating on networks described herein are not limited with regards to information carried by the networks, protocols used in the networks, the architecture/configuration of the networks, etc.

Service provider 1250 may include logic (e.g., software) that makes a service available to another device in distributed environment 1200. Service provider 1250 may include a server operated by an entity (e.g., an individual, a corporation, an educational institution, a government agency, etc.) that provides one or more services to a destination, such as client 102. The services may include software containing computer-executable instructions that may be executed, in whole or in part, by a destination, by service provider 1250 on behalf of the destination, or some combination thereof.

For example, in an embodiment, service provider 1250 may provide one or more subscription-based services to various customers via network 110. These services may be accessed by the customer (e.g., via client 102). Service provider 1250 may limit access to certain services based on, e.g., a customer service agreement between the customer and service provider 1250. The service agreement may allow the customer to access services that allow the customer to build and/or execute a model, to use legacy applications in a collaboration environment, etc. In addition, the service agreement may allow the customer to further analyze models, generate code from the models, generate various reports, access audit services that allow a customer's code to be audited, etc. The service agreement may include other types of arrangements, such as certain fee-based arrangements or restricted access arrangements. For example, a customer may pay a fee which provides the customer unlimited access to a given package of services for a given time period (e.g., hourly, daily, monthly, yearly, etc.). For services not included in the package, the customer may have to pay an additional fee in order to access the services. Still other arrangements may be resource-usage based. For example, the customer may be assessed a fee based on an amount of computing resources used, network bandwidth used, etc.

Target environment 1260 may include a device that receives information from client 102, service provider 1250, or cluster 1270. For example, target environment 1260 may receive executable code from client 102, where the executable code allows target environment to perform an operation when the code is executed. Client 102 may have generated the executable code using TCE 1204, graphical modeling software 1230, and/or a code generator (not shown in FIG. 12).

Cluster 1270 may include a number of processing resources that perform processing on behalf of another device, such as client 102, service provider 1250 and/or target environment 1260. Cluster 1270 may include logic that manages and/or coordinates the operation of multiple processing resources. For example, cluster 1270 may send data to and/or receive results from these processing resources. In an embodiment, cluster 1270 may include units of execution (UEs) 1280a, b, c, and d (collectively UEs 1280) that may perform processing on behalf of client 102 and/or another device, such as service provider 1250.

UEs 1280 may include hardware, software, or hybrid logic that perform processing operations on behalf of TCE 1204. UE 1280a, 1280b, 1280c, 1280d may be instances of server 120 that present a single fault tolerant interface for use by clients 102, 1204, and/or 106. For example, in an embodiment UEs 1280 may parallel process portions of a graphical model created by user of client 102. This parallel processing may include performing analysis on the model, parsing the model into portions, and/or aggregating results from respective UEs 1280 into a single result for display to a user at client 102. UEs 1280 may reside on a single device or chip or on multiple devices or chips. For example, UEs 1280 may be implemented in a single application specific integrated circuit (ASIC) or in multiple ASICs. Likewise, UEs 1280 can be implemented in a single computer system using virtualization techniques. Other examples of UEs 1280 may include field programmable gate arrays (FPGAs), complex programmable logic devices (CPLDs), application specific instruction-set processors (ASIPs), microprocessors, etc.

Exemplary Computing Architecture

Figure 13:
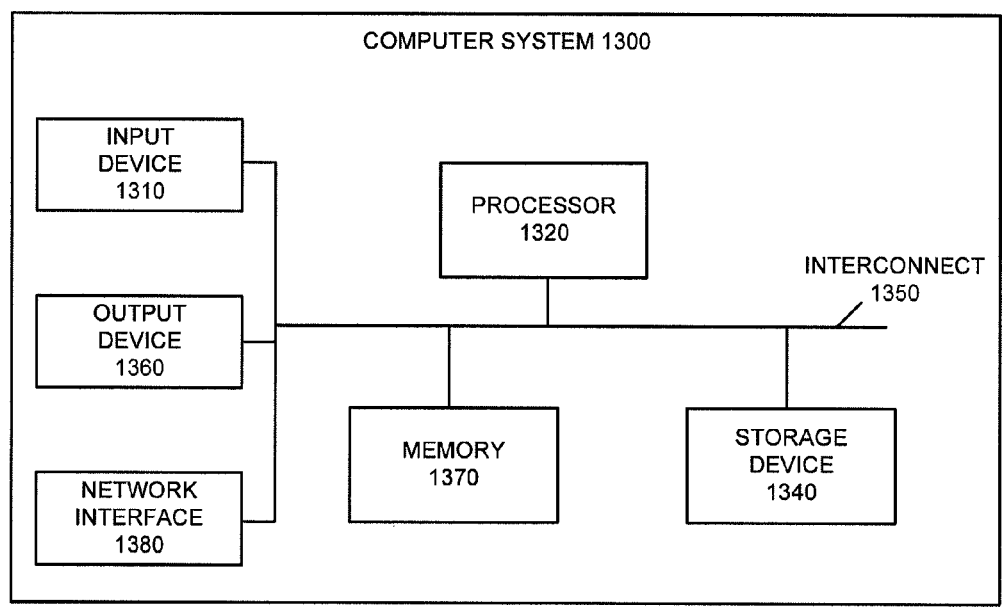
FIG. 13 illustrates an example of a computer system that may be configured to practice an exemplary embodiment.

FIG. 13 illustrates an example of a computer system 1300 that may be configured to practice an embodiment of the invention. For example, computer system 1300 may be used to implement clients 102, 104, and/or 106, server 120, service provider 1250, target environment 1260, etc. Computer system 1300 may include a processor 1320, memory 1370, storage device 1340, input device 1310, output device 1360, and network interface 1380. Processor 1320 may include logic configured to execute computer-executable instructions that implement embodiments of the invention. An example of a processor that may be used with the invention includes the Core processor available from Intel Corporation, Santa Clara, Calif. The instructions may reside in memory 1370 and may include instructions associated with TCE 1204.

Memory 1370 may be a tangible or non-transitory computer-readable medium that may be configured to store instructions configured to implement embodiments of the invention. Memory 1370 may be a primary storage accessible to processor 1320 and can include a random-access memory (RAM) that may include RAM devices, such as, for example, Dynamic RAM (DRAM) devices, flash memory devices, Static RAM (SRAM) devices, etc. Storage device 1340 may include a magnetic disk and/or optical disk and its corresponding drive for storing information and/or instructions.

Interconnect 1350 may include logic that operatively couples components of computer system 1300 together. For example, interconnect 1350 may allow components to communicate with each other, may provide power to components of computer system 1300, etc. In an embodiment of computer system 1300, interconnect 1350 may be implemented as a bus.

Input device 1310 may include logic configured to receive information for computer system 1300 from, e.g., a user. Embodiments of input device 1310 may include keyboards, touch sensitive displays, biometric sensing devices, computer mice, trackballs, pen-based point devices, etc. Output device 1360 may include logic configured to output information from computer system 1300. Embodiments of output device 1360 may include cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), etc.

Network interface 1380 may include logic configured to interface computer system 1300 with a network, e.g., network 110, and may enable computer system 1300 to exchange information with other entities connected to the network, such as, for example, service provider 1250, target environment 1260 and cluster 1270. Network interface 1380 may be implemented as a built-in network adapter, network interface card (NIC), Personal Computer Memory Card International Association (PCMCIA) network card, card bus network adapter, wireless network adapter, Universal Serial Bus (USB) network adapter, modem or any other device suitable for interfacing computer system 1300 to any type of network.

It should be noted that embodiments may be implemented using some combination of hardware and/or software. It should be further noted that a computer-readable medium that includes computer-executable instructions for execution in a processor may be configured to store embodiments of the invention. The computer-readable medium may include volatile memories, non-volatile memories, flash memories, removable discs, non-removable discs and so on. In addition, it should be noted that various electromagnetic signals such as wireless signals, electrical signals carried over a wire, optical signals carried over optical fiber and the like may be encoded to carry computer-executable instructions and/or computer data on e.g., a communication network for an embodiment of the invention.

A hardware unit of execution may include a device (e.g., a hardware resource) that performs and/or participates in parallel programming activities. For example, a hardware unit of execution may perform and/or participate in parallel programming activities in response to a request and/or a task it has received (e.g., received directly or via a proxy). A hardware unit of execution may perform and/or participate in substantially any type of parallel programming (e.g., task, data, stream processing, etc.) using one or more devices. For example, in one implementation, a hardware unit of execution may include a single processing device that includes multiple cores, and in another implementation, the hardware unit of execution may include a number of processors 1320. A hardware unit of execution may also be a programmable device, such as a field programmable gate array (FPGA), an application specific integrated circuit (ASIC), a digital signal processor (DSP), etc. Devices used in a hardware unit of execution may be arranged in substantially any configuration (or topology), such as a grid, ring, star, etc. A hardware unit of execution may support one or more threads (or processes) when performing processing operations.

A software unit of execution may include a software resource (e.g., a technical computing environment [e.g., MATLAB software], a worker, a lab, etc.) that performs and/or participates in parallel programming activities. For example, a software unit of execution may perform and/or participate in parallel programming activities in response to receipt of a program and/or one or more portions of the program. In an embodiment, a software unit of execution may perform and/or participate in substantially any type of parallel programming using one or more hardware units of execution. Embodiments of a software unit of execution may support one or more threads and/or processes when performing processing operations.

Exemplary Technical Computing Environment

TCE 1204 may include hardware-based logic and/or software that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc.

In one implementation, TCE 1204 may include a dynamically typed language that can be used to express problems and/or solutions in mathematical notations familiar to those of skill in the relevant arts. For example, TCE 1204 may use an array as a basic element, where the array may not require dimensioning. These arrays may be used to support array programming in that operations can apply to an entire set of values, such as values in an array. Array programming may allow array based operations to be treated as a high-level programming technique or model that lets a programmer think and operate on whole aggregations of data without having to resort to explicit loops of individual non-array, i.e., scalar operations.

TCE 1204 may further be adapted to perform matrix and/or vector formulations that can be used for data analysis, data visualization, application development, simulation, modeling, algorithm development, etc. These matrix and/or vector formulations may be used in many areas, such as statistics, finance, image processing, signal processing, control design, life sciences, education, discrete event analysis and/or design, state based analysis and/or design, etc.

TCE 1204 may further provide mathematical functions and/or graphical tools (e.g., for creating plots, surfaces, images, volumetric representations, etc.). In one implementation, TCE 1204 may provide these functions and/or tools using toolboxes (e.g., toolboxes for signal processing, image processing, data plotting, parallel processing, optimization, etc.). In another implementation, TCE 1204 may provide these functions as block sets (e.g., an optimization block set). In still another implementation, TCE 1204 may provide these functions in another way, such as via a library, etc. TCE 1204 may be implemented as a text based environment, a graphically based environment, or another type of environment, such as a hybrid environment that is both text and graphically based. TCE 1204 may also be browser based. TCE's may be available in multiple forms that work with a variety of operating systems, programming environments, and computing architectures.

For example, an alternative embodiment may implement TCE 1204 using one or more text-based products. For example, a text-based TCE, may be implemented using products such as, but not limited to, MATLAB® by The MathWorks, Inc.; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; or Modelica or Dymola from Dynasim.

Another alternative embodiment may implement TCE 1204 in a graphically-based TCE using products such as, but not limited to, Simulink®, Stateflow®, SimEvents™, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; or aspects of a Unified Modeling Language (UML) or SysML environment.

Yet another alternative embodiment may be implemented in a language that is compatible with a product that includes a TCE, such as one or more of the above identified text-based or graphically-based TCE's. For example, MATLAB (a text-based TCE) may use a first command to represent an array of data and a second command to transpose the array. Another product, that may or may not include a TCE, may be MATLAB-compatible and may be able to use the array command, the array transpose command, or other MATLAB commands. For example, the other product may use the MATLAB commands to execute code.

A further alternative embodiment may be implemented in a hybrid TCE that combines features of a text-based and graphically-based TCE. In one implementation, one TCE may operate on top of the other TCE. For example, a text-based TCE (e.g., MATLAB) may operate as a foundation and a graphically-based TCE (e.g., Simulink) may operate on top of MATLAB and may take advantage of text-based features (e.g., commands) to provide a user with a graphical user interface and graphical outputs (e.g., graphical displays for data, dashboards, etc.).

CONCLUSION

Implementations may provide devices and techniques that integrate legacy application 202 with server 120 via interface 206.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIGS. 3, 5-7, 9, and 10, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations of the figures depending on specific deployments and/or applications. Further, disclosed implementations may not be limited to any specific combination of hardware.

Further, certain portions of the invention may be implemented as "logic" that performs one or more functions. This logic may include hardware, such as hardwired logic, an application-specific integrated circuit, a field programmable gate array, a microprocessor, software, wetware, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

Headings and/or subheadings used herein are used to segment this patent application into portions to facilitate the readability of the application. These headings and/or subheadings are not intended to define or limit the scope of the invention disclosed and/or claimed in this patent application.

The scope of the invention is defined by the claims and their equivalents.

What is claimed is:

1. One or more tangible non-transitory computer-readable media holding computer-executable instructions, the computer-executable instructions instructing one or more processors to perform the following:
　　receive a legacy command from a legacy application, the command for accessing data, the legacy application configured for standalone use;
　　process the legacy command using an interface, where the processing includes:
　　　　converting the legacy command into a collaboration environment command compatible with a collaboration environment server;
　　request the data using the collaboration environment command;
　　receive a collaboration environment result based on the collaboration environment command, where the collaboration result comprises the requested data;
　　convert the collaboration environment result into a legacy result using the interface, where the legacy result includes the requested data;
　　provide the legacy result to the legacy application; and
　　present a representation of a file system of the collaboration environment server, where the representation portrays the file system as a file system compatible with the legacy application, wherein metadata that is incompatible with the legacy application is represented as one or more separate entries in a persistent storage system for the legacy application.

2. The media of claim 1, wherein processing the command using the interface comprises:
　　adding metadata to the command, where the metadata is compatible with the collaboration environment.

3. The media of claim 1, wherein converting the collaboration environment result comprises:
　　removing the metadata when the metadata is incompatible with the legacy application.

4. The media of claim 1, wherein the data comprises at least one of content or metadata.

5. The media of claim 4, wherein the metadata comprises at least one of:
　　permission information, version information, creation information, content summary, categorization information, tags, ratings, or comments.

6. The media of claim 1, wherein the collaboration environment server is accessible to a plurality of clients for accessing shared and non-shared data.

7. The media of claim 1, wherein the computer-executable instructions further instruct the one or more processors to:
　　identify a user; and
　　authorize the command based on the identified user.

8. The media of claim 1, wherein the instructions further instruct the one or more processors to:
　　share the data with a second legacy application.

9. The media of claim 1, wherein
　　the computer-executable instructions are downloaded to a computer system, which when executed by the computer system causes the computer system to perform operations comprising the downloaded instructions;
　　the computer-executable instructions are provided to the computer system, which when executed by the computer system causes the computer system to perform the computer-executable instructions; or the computer-executable instructions are performed in a distributed environment.

10. The media of claim 1, wherein the legacy application includes one of: a word processing application, a spreadsheet application, a database application, or a graphics application.

11. The media of claim 1, wherein the interface represents a shared file on the file system.

12. A computer-implemented method comprising:
receiving, by a computer, a notification of updated computer-executable instructions or data in a collaboration environment compatible format, the notification received from a collaboration environment server;
saving, by the computer, a copy of the updated computer-executable instructions or the data in a local persistence based on the notification;
converting, by the computer, the updated computer-executable instructions or the data into a legacy application compatible format;
providing, by the computer, the converted updated computer-executable instructions or data to a legacy application, the legacy application configured for standalone use; and
presenting, by the computer, a representation of a file system of the collaboration environment server, where the representation portrays the file system as a file system compatible with the legacy application, wherein metadata that is incompatible with the legacy application is represented as one or more separate entries in a persistent storage system for the legacy application.

13. The computer-implemented method of claim 12, further comprising:
determining that the computer-executable instructions or the data should be updated based on stored rules, where the rules are user defined rules or are system defined rules.

14. The computer-implemented method of claim 12, wherein saving the copy comprises:
updating a copy of the computer-executable instructions or the data based on the notification.

15. The computer-implemented method of claim 12, further comprising:
querying for rules;
receiving rules from a user; and
storing the received rules as stored user defined rules.

16. A system comprising:
a legacy application on a first computer, the legacy application configured for standalone use; and
an interface on the first computer coupled to the legacy application, the interface configured to:
access a collaboration environment server,
receive a command from the legacy application, the command for accessing data,
process the command,
convert the legacy command into a collaboration compatible command, where the collaboration compatible command is compatible with the collaboration environment server, and where the converting is based on the processing,
provide the collaboration compatible command to the collaboration environment server,
receive a collaboration environment result from the collaboration environment server,
convert the collaboration environment result into a legacy result using the interface, where the converting makes the legacy result compatible with the legacy application,
provide the legacy result to the legacy application, and
present a representation of a file system of the collaboration environment server, where the representation portrays the file system as a file system compatible with the legacy application, wherein metadata that is incompatible with the legacy application is represented as one or more separate entries in a persistent storage system for the legacy application.

17. The system of claim 16, wherein the collaboration environment server is coupled to a plurality of other collaboration environment servers and receives data from the plurality of other collaboration environment servers.

* * * * *